(12) United States Patent
Lairsey et al.

(10) Patent No.: US 11,599,742 B2
(45) Date of Patent: Mar. 7, 2023

(54) DYNAMIC IMAGE RECOGNITION AND TRAINING USING DATA CENTER RESOURCES AND DATA

(71) Applicant: Dell Products L.P., Round Rock, TX (US)

(72) Inventors: Jeffrey M. Lairsey, Round Rock, TX (US); Saurabh Kishore, Round Rock, TX (US); Alexander P. Rote, Hutto, TX (US); Sudhir V. Shetty, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 329 days.

(21) Appl. No.: 16/854,973

(22) Filed: Apr. 22, 2020

(65) Prior Publication Data

US 2021/0334588 A1    Oct. 28, 2021

(51) Int. Cl.
*G06K 9/62* (2022.01)
*G06N 5/04* (2006.01)
*G06N 20/00* (2019.01)
*H04L 67/10* (2022.01)
*G06V 10/774* (2022.01)
*G06N 5/00* (2006.01)
*G06V 10/94* (2022.01)
*G06V 20/20* (2022.01)
*H04M 1/72403* (2021.01)
*H04M 1/725* (2021.01)

(52) U.S. Cl.
CPC .......... *G06K 9/6256* (2013.01); *G06N 5/04* (2013.01); *G06N 20/00* (2019.01); *H04L 67/10* (2013.01); *H04M 1/725* (2013.01)

(58) Field of Classification Search
CPC ...... G06K 9/6256; G06K 9/6257; G06N 5/04; G06N 20/00; H04L 67/10; H04M 1/725; H04M 2250/52; H04M 1/72403; G06V 10/95; G06V 20/20
See application file for complete search history.

(56) References Cited

U.S. PATENT DOCUMENTS

| | | | |
|---|---|---|---|
| 9,665,794 B2 * | 5/2017 | Rai | G06V 10/751 |
| 11,200,451 B2 * | 12/2021 | Huang | G06K 9/6223 |
| 2011/0241833 A1 * | 10/2011 | Martin | H04L 41/50 |
| | | | 707/705 |
| 2012/0313963 A1 * | 12/2012 | Chen-Quee | G06F 3/147 |
| | | | 345/593 |
| 2014/0258052 A1 * | 9/2014 | Khuti | G06Q 10/087 |
| | | | 705/28 |
| 2017/0024869 A1 * | 1/2017 | Konishi | G06V 10/751 |
| 2019/0130292 A1 * | 5/2019 | N | G06N 20/00 |

(Continued)

FOREIGN PATENT DOCUMENTS

WO    WO-2013052451 A2 *   4/2013   ............. G06F 16/50

*Primary Examiner* — Asghar H Bilgrami
(74) *Attorney, Agent, or Firm* — Terrile, Cannatti & Chambers, LLP; Emmanuel A. Rivera (57) ABSTRACT

A system, method, and computer-readable medium are disclosed for creating image recognition models, which can be operated on smartphone or similar device. The smartphone captures images of hardware in a data center. The captured images are processed to produce a full set of annotated images. The full set is minimized to a simplified set and trained to create a mobile image recognition model implemented by the smartphone or similar device.

20 Claims, 6 Drawing Sheets

(56) References Cited

U.S. PATENT DOCUMENTS

| | | | |
|---|---|---|---|
| 2019/0347761 A1* | 11/2019 | Han | G06T 7/194 |
| 2019/0392382 A1* | 12/2019 | Han | G06Q 10/087 |
| 2020/0057883 A1* | 2/2020 | Ge | G06V 40/174 |
| 2020/0334620 A1* | 10/2020 | Yanagi | G06Q 30/06 |
| 2021/0042564 A1* | 2/2021 | Xiao | G06F 16/5854 |
| 2021/0272681 A1* | 9/2021 | Zheng | G16H 30/40 |
| 2021/0287782 A1* | 9/2021 | Vadali | G16H 40/40 |
| 2021/0335002 A1* | 10/2021 | Wang | G06T 7/73 |
| 2022/0108467 A1* | 4/2022 | Foutzitzis | G01S 19/485 |

* cited by examiner

DYNAMIC IMAGE RECOGNITION AND TRAINING USING DATA CENTER RESOURCES AND DATA

BACKGROUND OF THE INVENTION

Field of the Invention

The present invention relates to information handling systems. More specifically, embodiments of the invention relate to detecting, classifying, and locating of hardware in a data center implementing dynamic image recognition and training using resources and data of the data center.

Description of the Related Art

As the value and use of information continues to increase, individuals and businesses seek additional ways to process and store information. One option available to users is information handling systems. An information handling system generally processes, compiles, stores, or communicates information or data for business, personal, or other purposes thereby allowing users to take advantage of the value of the information. Variations in information handling systems allow for information handling systems to be general or configured for a specific user or specific use such as transaction processing, airline reservations, enterprise data storage, or global communications. In addition, information handling systems can include a variety of hardware and software components that can be configured to process, store, and communicate information and may include one or more computer systems, data storage systems, and networking systems. Further, information handling systems can be incorporated in a variety of environments, including, for example, desktop devices, mobile devices, and large data center configurations with hundreds-to-thousands of information handling systems in multiple environmentally controlled rooms.

In a data center environment where there can be thousands of information handling systems, managing and tracking such systems presents challenges to data center management. These challenges can include, for example, detecting, classifying, and locating hardware in the data center environment.

SUMMARY OF THE INVENTION

A system, method, and computer-readable medium are disclosed for creating image recognition models, which can be operated on smartphone or similar device. The smartphone captures images of hardware in a data center. The captured images are processed to produce a full set of annotated images. The full set is minimized to a simplified set and trained to create a mobile image recognition model utilized by the smartphone or similar device.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for creating image recognition models that support a data center. In particular, identifying, locating, and classifying the various hardware in the data center. For purposes of this disclosure, an information handling system includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
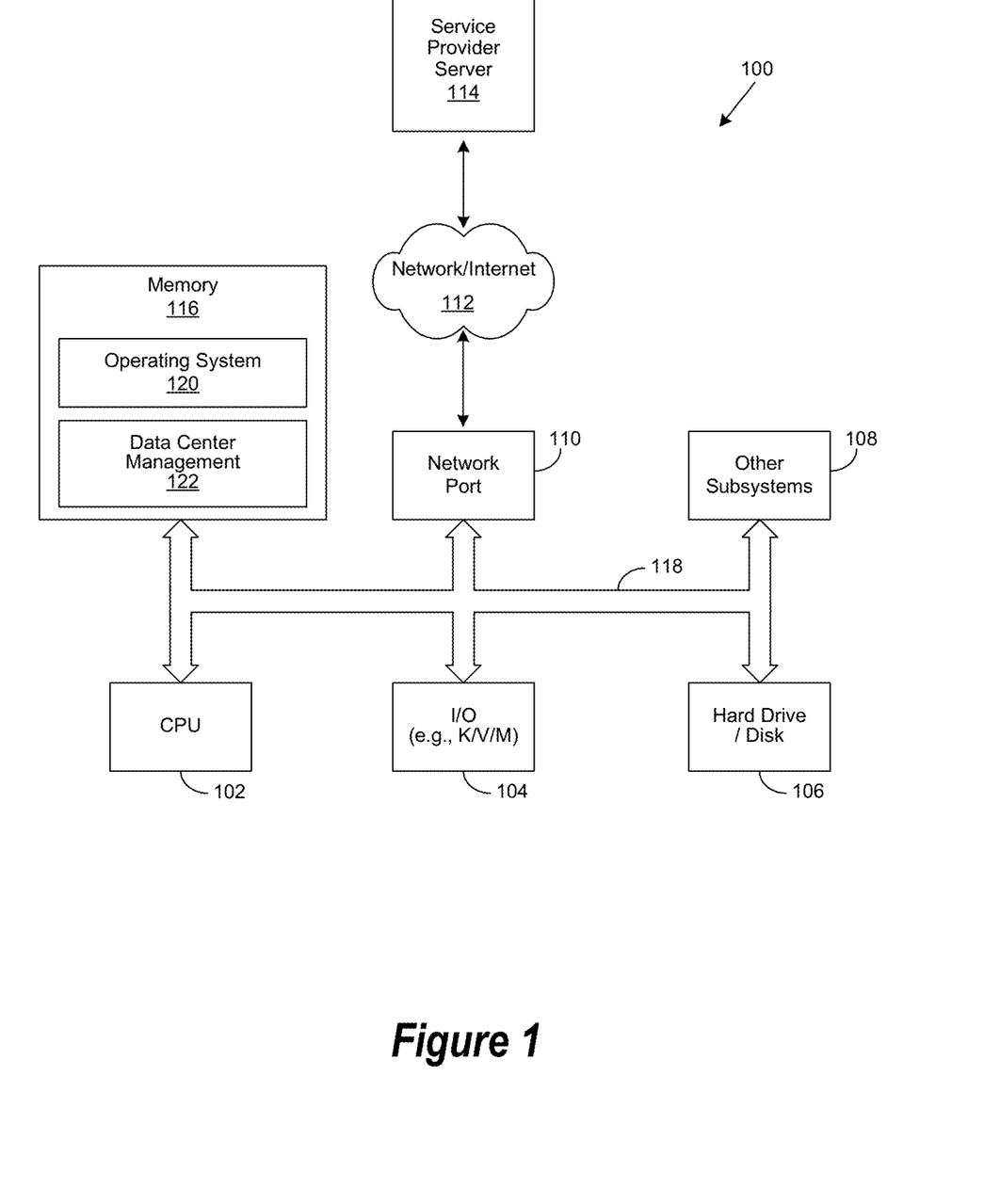
FIG. 1 is a generalized illustration of an information handling system that can be used to implement the system and method of the present invention.

FIG. 1 is a generalized illustration of an information handling system 100 that can be used to implement the system and method of the present invention. Information handling system 100 includes one or more processors (e.g., one or more processing cores or a central processor unit (CPU)) 102, input/output (I/O) devices 104, such as a display, a keyboard, a mouse, and associated controllers, a hard drive or disk storage 106, and various other subsystems 108. In various embodiments, information handling system 100 also includes one or more network ports 110 providing communication interfaces to networks external to the information handling system. One example of a network port includes a network interface card (e.g., Ethernet) operable to connect to a network 112, which is likewise accessible by a service provider server 114. The network 112 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention.

Information handling system 100 likewise includes system memory 120, which is interconnected to the foregoing via one or more buses 118. System memory 120 further comprises operating system 120 and in various embodiments comprises data center management system 122. In an embodiment, the information handling system 100 is able to download the data center management system 122 from the service provider server 114. In another embodiment, the data center management system 122 is provided as a service from the service provider server 114.

Data center management system 122 performs classifications for hardware in a data center as described herein, using an image recognition model. Data management system 122 receives uploaded captured images from a smartphone or device and processes the captured images. In certain implementations, the data management system 122 provides new or updated image recognition models that are implemented n the smartphone or device. Other processes are performed by data management system 122, and the information handling system 100 also referred to as remote 100, as described herein.

Figure 2:
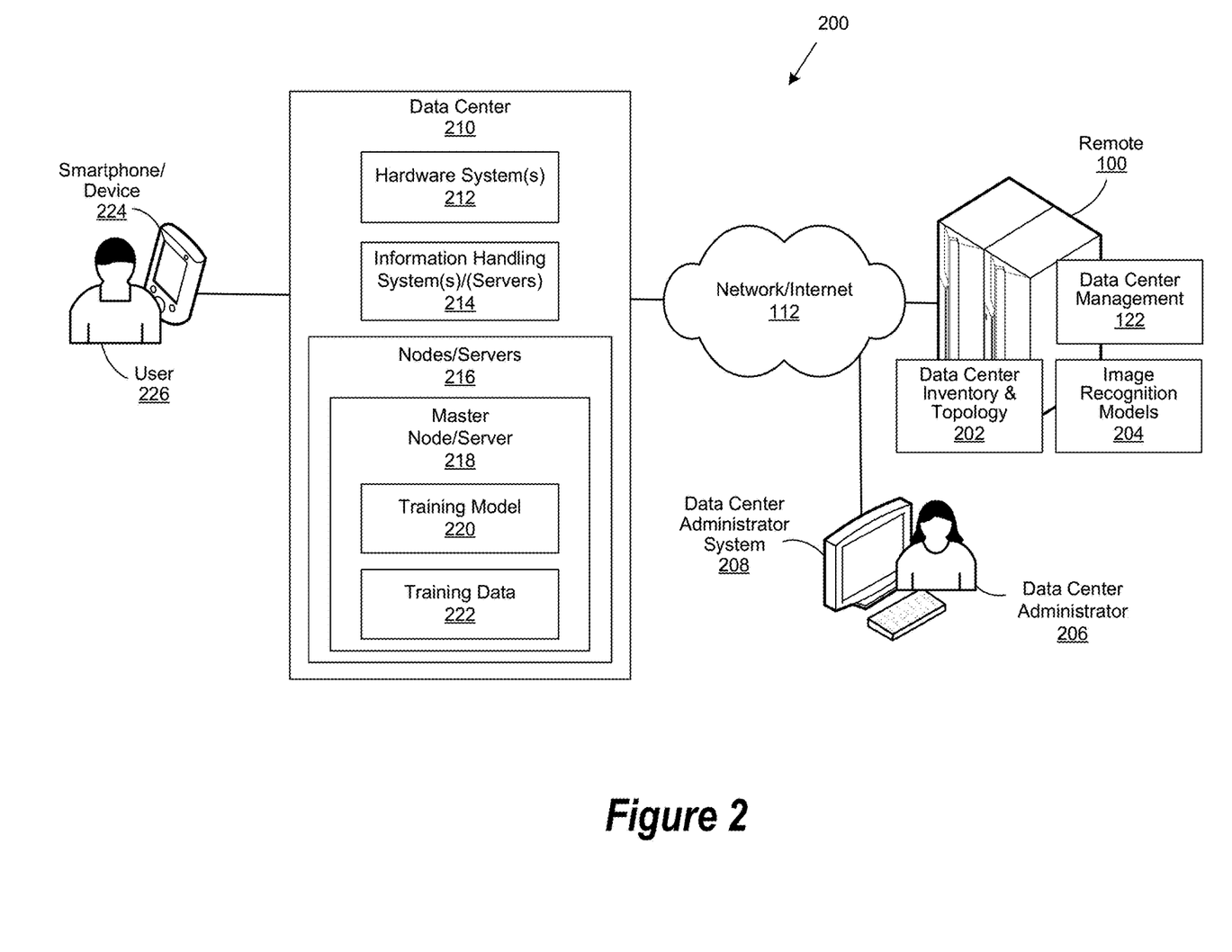
FIG. 2 is a simplified system diagram of an environment for detecting, classifying, and locating of hardware in a data center.

FIG. 2 shows an environment for detecting, classifying, and locating of hardware in a data center. The environment 200 includes the information handling system 100 described in FIG. 1. In certain embodiments, the information handling system 100 is deployed as a remote system. The information handling system 100 or remote 100, and particularly the data center management system 122 can be a cloud hosted machine or a user deployed enterprise solution. The data center system 122 has information and data as to hardware and configuration of a data center as further described herein and can be considered as a data center manager. In this regard, the remote 100 includes data center inventory and topology information 202. As further described herein, the remote 100 includes image recognition models 204. A data center administrator 206 through a data center administrator system 208 can interact with the information handling system 100.

A data center 210 connects to the remote 100 through network 112. Data center 210 includes various hardware systems/subsystems, devices and components, such as servers, chassis, etc. Such hardware is represented by hardware system(s) 212 and information handling system(s)/server(s) 214. Furthermore, the data center 210 can include a system of nodes or servers as represented by nodes/servers 216. In various implementations, a network of nodes/servers 216 are interconnected by a wired and/or wireless configuration, such as mesh network in data center 210. The nodes/servers 216 include servers that are configured to process machine learning. In certain implementations, such servers can include a remote access controller, such as an iDRAC, and a Bluetooth Low Energy (BLE) or wireless access point connection technology, such as Quick Sync 2.

In various implementations, the nodes/servers 216 include a master node/server 218, which as described herein can be implemented. The master node/server 218 can effectively be an agnostic helper and not tailored to the data center 210 and not managed by data center administrator 206. In certain implementations, the master node/server 218 can include a training model 220 and training data 222 as further described herein.

To support image recognition in data center 210, a smartphone/device 224 is provided. The smartphone smartphone/device 224 is operated by a user 226, where user 226 can be the data center administrator 206. As described herein, the smartphone/device 224 includes a camera and provided with image recognition models and can be implemented to locate in picture a limited number of classifications of hardware, such as a particular server's front-face appearance or a modular chassis' front-face appearance.

Figure 3:
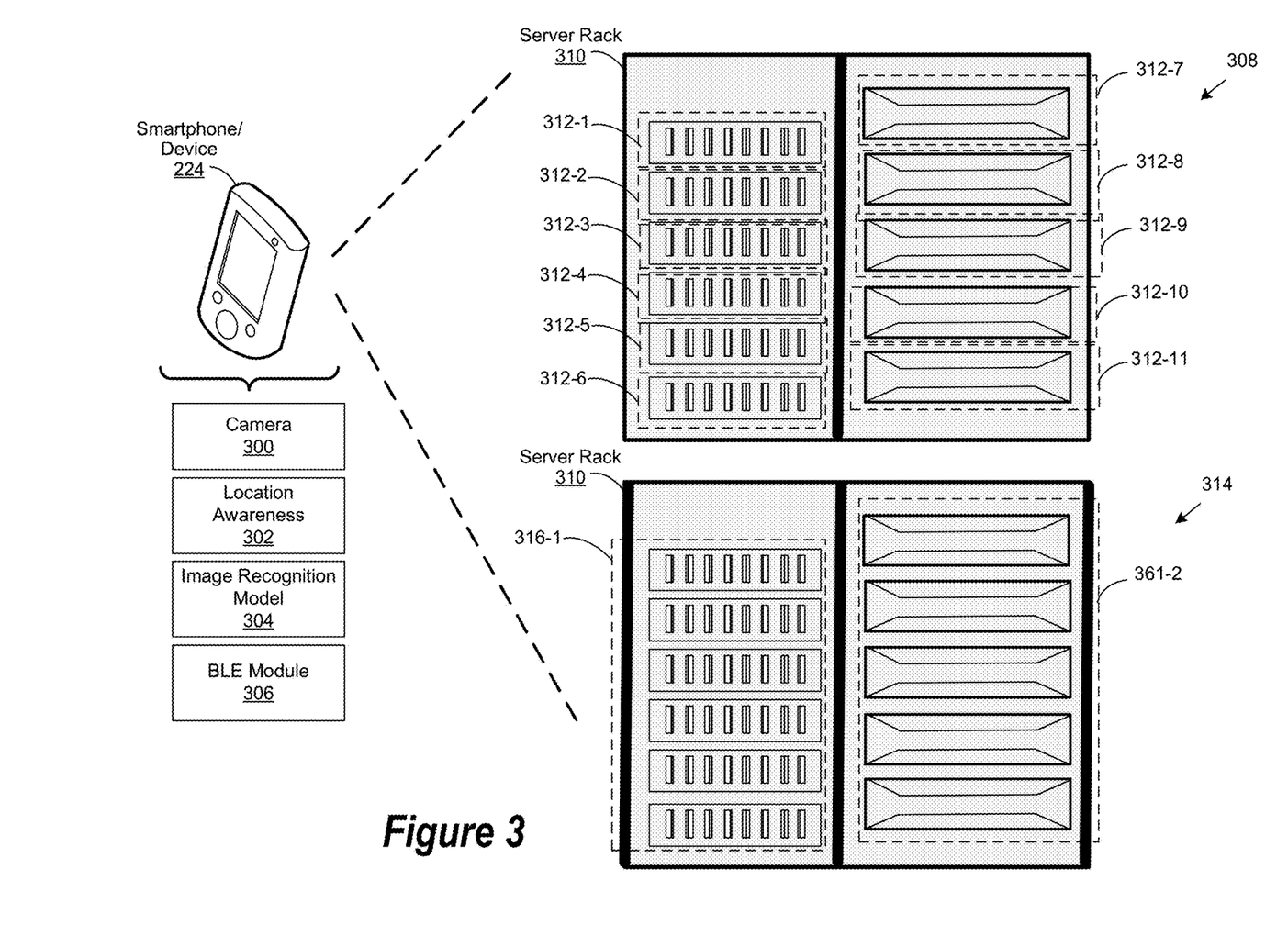
FIG. 3 is a simplified block diagram of a smartphone/device and sets of captured images.

FIG. 3 shows image identification by smartphone/device 224. In certain implementations, as described herein, the smartphone/device 224 includes a camera 300, a location awareness application/component 302, an image recognition model 304 and a Bluetooth Low Energy (BLE) module 306. BLE is an example of a mesh protocol that enables nodes within a mesh to communicate with each other using message-oriented protocol.

The image recognition model 304 can include features to identify and capture images of hardware in data center 210. The image recognition model 304 is periodically updated, as described herein, by the remote 100. In an optimization performed to image recognition model 304, visual appearance is performed on the data center 210, by the smartphone/device 224. The visual appearance capturing can be used as a base to train the image recognition model 304 and models provided/updated by the remote 100.

The camera 300 captures the appearance of data center 210. Through an image recognition feature of the image recognition model 304, smartphone/device 224 stores captured images. For example, to perform a more comprehensive appearance definition, user 206 walks up and down aisles of data center 210 aisles to capture different angles of racks and hardware and produce a complete video that contains all individual captured images. The set of captured images or completed video can be uploaded to the remote 100 for processing.

The remote 100 can include a master training model that contains classifications for hardware of the data center 210. The remote 100 has considerable processing power than the smartphone/device 224 to run image recognition. By running the master training model on the remote 100 on all the individual captured images in the upload, the remote 100 is able to produce a new set of images that are annotated to the complete set of possible hardware.

A set of images 308 of a server rack 310 of data center 210 is captured. The smartphone/device 224 using the camera 300 captures images 312-1 through 312-11. Images 312-1 through 312-11 are part of the set of images 308.

The remote 100 performs advanced image recognition on images 312-1 through 312-11 to produce fully annotated images of several possible bounds as represented by the dotted lines of images 312-1 through 312-11. In certain implementations, the master node/server 218 provides a new or updated master training model to the remote 100. The new or updated master training model can include information about new classifications, new hardware, new optimizations, etc.

The smartphone/device 224 provides location of hardware of the data center 210 using the location awareness application/component 302. The location awareness application/component 302 can implement GPS, augmented reality, indoor tracking, and other similar technology to determine location of smartphone/device 224, and by association location of hardware of data center 210. In certain implementations, such location modeling can provide the capability to use different image recognition models based on location. For example, two aisles in a data center may look significantly different. Utilizing a separate image recognition model for each aisle can result in significantly more accuracy than trying to use one image recognition model for both aisles. In such a data center environment, smartphone/device 224 tags each captured image based on a determined location before uploading the captures to the remote 100.

In another optimization, image annotation is performed using data of data center 210. A completely annotated set of images are simplified to a minimum set of classifications. An image recognition model can include classifications for all the hardware in the data center 210. Such an image recognition model with classifications for all hardware would include too many classifications to use and execute on the smartphone/device 224. In an implementation, the remote 100 creates a template from the original list of classifications and reduces the list to a minimum set. By using a minimum set of classifications, the remote updates the annotations on the images to match a reduced minimum set of classifications.

An original list of classifications can be reduced by pruning any classifications that do not appear in any of the master set of annotations. Hardware that does not appear in the data center 210 does not need to be recognized by finalized image recognition model, therefore awareness of such hardware in the image recognition model can be removed. The original list of classifications can also be reduced by identifying certain "annotation patterns", and combining such into a single, new classification. This has the advantage of removing classifications from the list and can improve image recognition processing on the smartphone/device 224.

In certain implementations, the remote 100 applies heuristics across the entire set of captured images that are available. One heuristic can apply very well on one single captured image but not across captured images. Therefore, the remote 100 favors when multiple heuristics apply together. From the annotated example of set of images 308, reduction of previous classification is reduced to two samples of images. In set of images 308 there are eleven images, images 312-1 through 312-11. The updated set of images 314 is reduced to two, samples of images 316-1 and 316-2. Classification is made as to group of similar servers represented as 316-1 and another classification is made to another group of servers as 316-2.

In certain implementations, the remote 100 is configured to understand the patterns in the original annotated images and to predict the location of each image, based on the hardware present in the image and the prior-known configuration of the data center 210. Smartphone/device 224 through the location awareness application/component 302 tags captured images. As discussed, the remote 100 distinguishes captured images based on location in data center 210. The remote 100 applies heuristics separately for each location and produces different sets of annotated captured images for different locations, where each different set has a different template of classifications that would be trained against different sets of annotated captured images for different locations, where each different set has a different template of classifications that would image recognition model be trained against.

In another optimization, the remote 100 dynamically trains and distributes finalized image recognition models (i.e., a mobile image recognition model) to the smartphone/device 224. An image recognition model may come prepopulated in an application of the smartphone/device 224; however, interaction between the remote and the smartphone/device 224 can provide for dynamically created image recognition models that are custom tailored and directly distributed.

When the remote 100 receives a new set of annotated images, the remote 100 can begin training a mobile image recognition model. The processing capabilities at the remote 100 are leveraged over that of the smartphone/device 224 to generate such image recognition models in a timely manner. The remote 100 can train a new set of annotated images along with a set of master images that are tailored to the classification template of the new set.

In an implementation, the remote 100 produces and pushes the new image recognition model to the smartphone/device 224. The smartphone/device 224 stores the image recognition model in a related application's file system, to be consumed by an image-recognition feature. If the remote 100 produces multiple models, such as based on distinct locations in the data center 210, then image recognition feature of the smartphone/device 224 can use different models when a particular location in the data center 210 is detected, such as through the location awareness application/component 302.

Periodically, the master node/server 218 pushes a new set of master images to the remote 100. The new set of master images contains images and annotations with new classifications, new hardware, new optimizations, etc. Implementations can provide for filtering the set of master images to only train with the images that are relevant to the classifications captured by a previous set of images.

As will be evident, the described processes can be implemented as an iterative loop that improves image recognition models over time. For example, the smartphone/device 224 captures new images as to the data center whenever the image recognition feature is used. The master node/server 218 pushes new information to the remote 100 and the remote 100 can reprocess the described process above. Process can be performed in parallel or buffered at the remote 100 considering the time involved in creating/recreating image recognition models.

Figure 4:
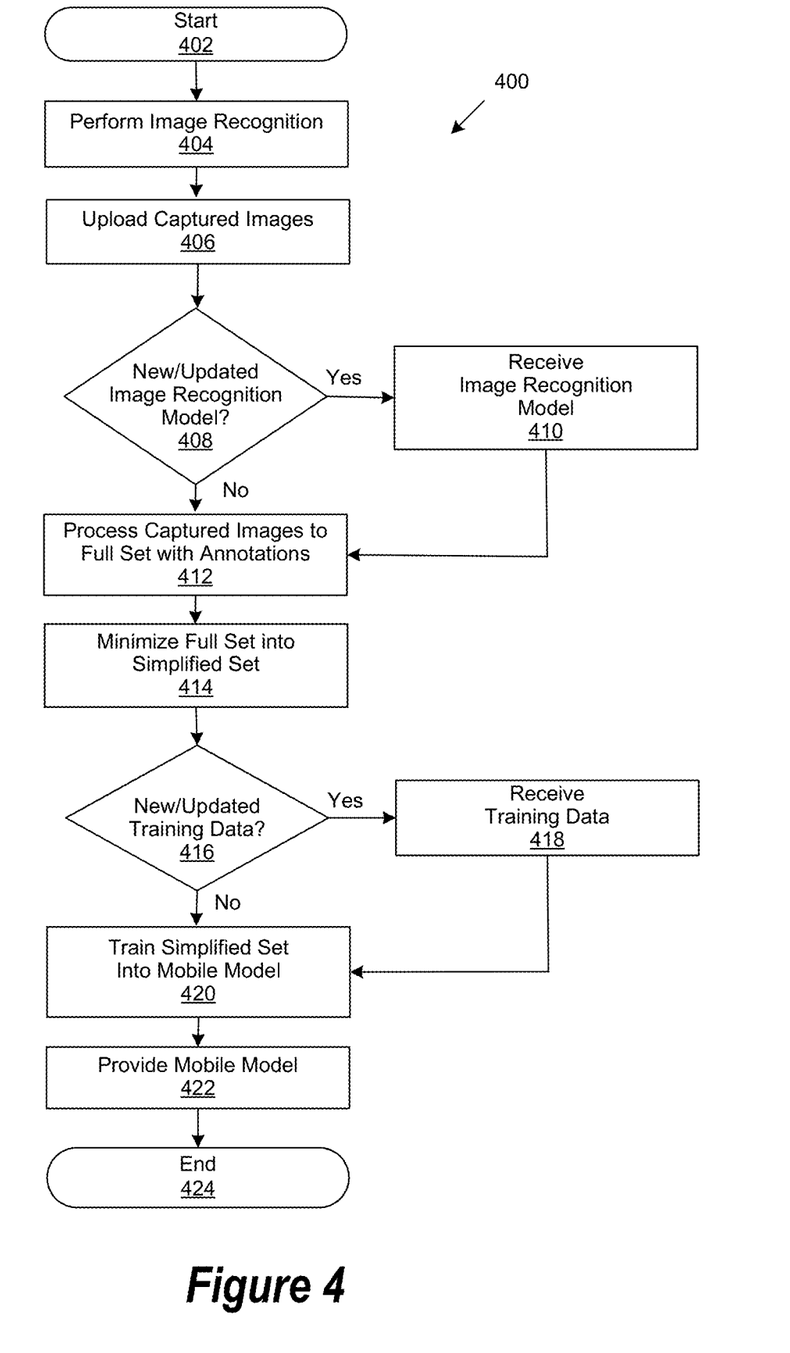
FIG. 4 is a simplified flow diagram illustrating an example process for dynamically creating image recognition models using data center resources and data.

FIG. 4 is a simplified flow diagram illustrating an example process for dynamically creating image recognition models using data center resources and data. As described herein, an image recognition model is trained and executed on information handling system or remote 100. Annotated images and classifications can be simplified at the remote 100 using data center 210 data to identify a minimal set of classifications. The remote 100 trains simplified annotations into a new image recognition model that is provided to smartphone/device 224 for use.

The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402 the process 400 starts. At block 404, image recognition is performed. Images are captured by the user 226 through the smartphone/device 224 and particularly the camera 300. Images are capture of hardware in data center 210. The image capturing can be performed using an image recognition feature on an application, or image recognition model 304 of smartphone/device 224.

At block 406, uploading is performed of the captured images. The capture images being part of a user 206 interaction with data center 210. Uploaded images can be part of a set of captured images or a video as described herein.

The remote 100 may periodically receive a new master image recognition model, as new hardware classifications or optimizations are produced. If a new or updated training image recognition model is available from master node/server 218, following the "Yes" branch of block 408, at block 410 the new image recognition model is received, and block 412 is performed. Otherwise, following the "No" branch of block 408, block 412 is performed.

At block 412, a master image recognition model processes the capture images or video to produce a full set of annotations on the captured images or video as described herein.

At block 414, the full set of annotated images is simplified, and paired with a new template of classifications based on a simplified set from the master image recognition model.

The remote 100 may periodically receive a new set of master annotated images, as new hardware classifications or optimizations are produced. If a new or updated training data is available from master node/server 218, following the "Yes" branch of block 416, at block 418 the new training data is received, and block 420 is performed. Otherwise, following the "No" branch of block 408, block 420 is performed.

At block 420, the simplified model is trained to a mobile image recognition model. At block 422, the mobile image recognition model is pushed/provided to the smartphone/device 224. At block 426, the process 400 ends.

In certain implementations, the smartphone/device 224 is implemented to find suitable nodes or servers of nodes/servers 216 of data center 210 to execute distributed image recognition. The smartphone/device 224 opens a connection, such as a wireless connection, to available nodes/servers 216. An image feed is provided to connected nodes/servers 216 which perform processing and return a classified response. This processing can be performed in parallel with processing by smartphone/device 224.

Figure 5:
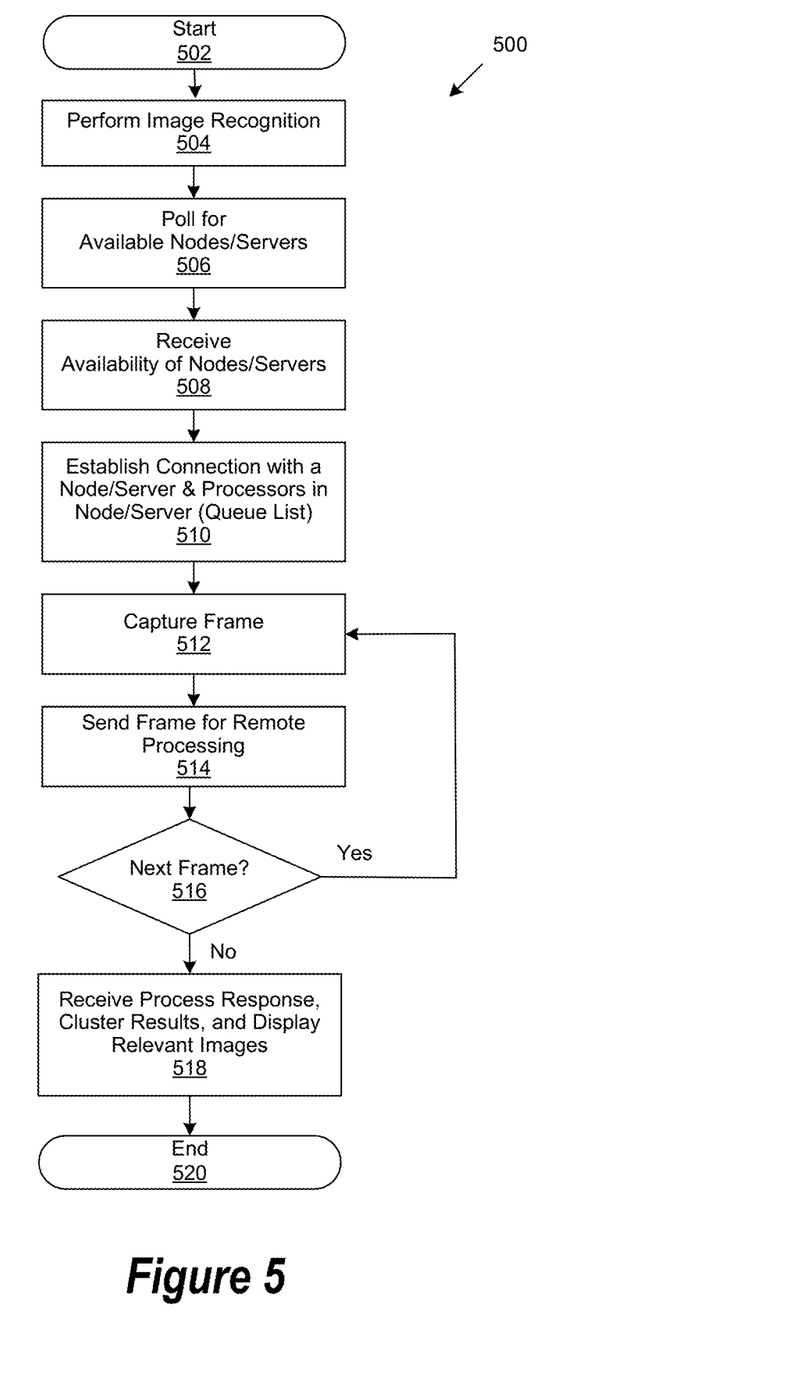
FIG. 5 is a simplified flow diagram illustrating an example process for identifying nodes/servers to execute distributed image recognition.

FIG. 5 is a simplified flow diagram illustrating an example process for identifying nodes/servers to execute distributed image recognition. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502 the process 500 starts. At block 504, image recognition is performed. The user 226 implements an image recognition feature on the smartphone/device 224.

At block 506, the smartphone/device 224 polls for available nodes/servers 216. Block 506 can be performed by scanning the data center 210 for available nodes/servers 216. In an implementation, smartphone/device 224 can use BLE broadcasts through BLE module 306 to find nearby nodes/servers 216. The BLE broadcast can contain the node/server's identification information, as well as a flag that determines whether the node/server is capable of distributed image recognition. This technique has an advantage of limiting the scanning range to nearby nodes/servers ensuring the connection has a stronger signal strength and lower latency. In another implementation, smartphone/device 224 the remote 100 and data center management system 122 for available servers. In turn, the data center management system 122 will periodically poll nodes/servers 216. The aggregated results of all the nodes/servers 216 in the data center 210 can then be returned to the smartphone/device 224. The advantage of this technique is that there may be a wider selection of nodes/servers 216 to distribute amongst. The implementations may be used for different situations. For example, polling over BLE first, data center management system 122 in the event that too few nearby connections are available.

At block 508, available of nodes/servers 216 is received. For each available node/server 216 an indication, such as a flag, is received (displayed by node/server 216) that indicates capability to perform distributed image recognition.

At block 510, connection is established with the identified nodes/servers 216 and the processors of the identified nodes/servers 216. Smartphone/device 224 maintains a low-overhead, high-speed connection to any available nodes/servers 216. The smartphone/device 224 manages connections in an "availability queue" of available processors of nodes/servers 216. A first item in this queue can be the smartphone/device 224. As connections are established, the smartphone/device 224 adds details to the end of the queue, and as connections are lost, the smartphone/device 224 will remove those from the queue regardless of their position. When establishing a connection, the smartphone/device 224 upload its image recognition model to the node/server 216. This ensures that the smartphone/device 224 and node/server 216 and are operating against the same image recognition model. When establishing the connection, the node/server 216 disable the flag indicating its availability for further distributed image recognition with other users (smartphones/devices).

At block 512, a frame of an image is captured. The camera 300 of smartphone/device 224 can perform the capturing. At block 514, the smartphone/device 224 finds the next available processor in its list and distributes the frame to the processor. If another frame is to be captured, following the "Yes" branch of block 516, then block 512 is performed. Otherwise, following the "No" branch of block 516, at block 518, the smartphone/device 224 receives a processed response which is clustered into results, analyzed, and is displayed with recognized images. At block 520, the process ends.

Figure 6:
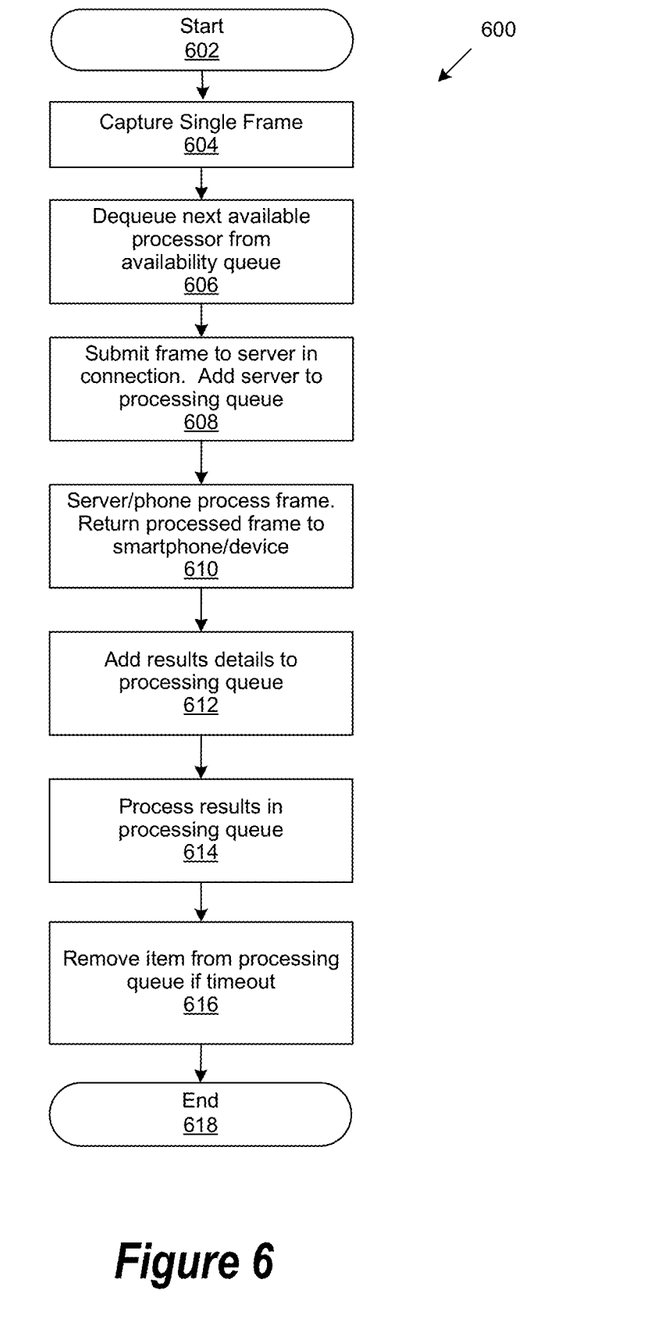
FIG. 6 is a simplified flow diagram illustrating example process for distributed image recognition in sequence processing.

FIG. 6 is a simplified flow diagram illustrating an example process for distributed image recognition in sequence processing. The smartphone/device 224 provides for an image recognition feature that runs a camera feed, add locations and classifications to the camera feed, and display details to user 226. This can be accomplished by extending the serially processed image recognition on the smartphone/device 224 to perform in parallel amongst processors in an availability queue.

The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602 the process 600 starts. At block 604, the smartphone/device 224 captures a frame of an image from a camera feed. The camera 300 can perform this capture.

At block 606, the smartphone/device 224 is configured with an "availability queue" of processors of available nodes/servers 216. Furthermore, the smartphone/device 224, maintains connections as described in FIG. 5. The smartphone/device 224 then dequeues the next available processor from the "availability queue", noting the details about the connection. If there is no available processor, the captured frame is lost, and the loop continues back at the start of the process 600.

At block 608, smartphone/device 224 submits the frame to the node/server 216 identified by the connection. This node/server 216 is the next added to a "processing queue". If the details were instead the smartphone/device 224 not the node/server 216, then the smartphone/device 224 simply processes the frame on its own, on a separate thread.

At block 610, either the node/server 216 or the smartphone/device 224 processes the frame using the image recognition model as provided/installed on the smartphone/device 224. When the frame is processed, the processed frame is sent to the smartphone/device 224 if processed by the node/server 216, or the processed frame is sent to a main thread if processed by the smartphone/device 224.

At block 612, the smartphone/device 224 then adds the results details into the "processing queue." At block 614, the smartphone/device 224 begins processing the results in the "processing queue." If the first item in the "processing queue" contains results, the smartphone/device 224 dequeues the item and handles the results, and the item is queued back to the "availability queue." This step may then continue for all the items in the "processing queue" until an item does not have results or until the "processing queue" is empty.

At block 616, the item is removed from the "processing queue" if a timeout occurs, until a response is received. The response can be ignored, and the item is either added back to the "availability queue" or the connection is terminated based on heuristics that analyze if the connection is working or not. Whenever a timeout occurs, block 614 can be performed for any other results that may now be available. For effective processing management and in order to display accurate results, the timeout should be relatively short. At block 618, the process 600 ends.

As will be appreciated by one skilled in the art, aspects of the present invention may be embodied as a method, system, or computer program product. Accordingly, aspects may be implemented entirely in hardware, entirely in software (including firmware, resident software, micro-code, etc.) or in an embodiment combining software and hardware. These various embodiments may all generally be referred to herein as a "circuit," "module," or "system." Furthermore, embodiments may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of embodiments of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the present invention are well adapted to attain the advantages mentioned as well as others inherent therein. While the present disclosure has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for creating image recognition models, the method comprising:
   receiving captured images of hardware in a data center;
   processing the captured images to produce a full set of annotated captured images;
   minimizing the full set of annotated captured images with a template, wherein a minimum set of classifications based on pruning classifications in a master set of annotations is used to create a simplified set of images, wherein the pruning classifications is performed by identifying annotation patterns and applying multiple heuristics; and training the simplified set of images into a mobile image recognition model, to understand patterns on the original annotated captured images to predict location of the hardware in the data center.

2. The method of claim 1, wherein the captured images are image frames or video captured by a smartphone implementing Bluetooth Low Energy (BLE).

3. The method of claim 1, wherein the captured images include location in the data center.

4. The method of claim 1, wherein processing is done in sequence with a node or server in the data center and/or a smartphone.

5. The method of claim 1, wherein the processing includes receiving periodically a new or updated training master image recognition model from a master node or server in the data center.

6. The method of claim 1, wherein the processing includes identifying available nodes or servers, and processors in the available nodes and servers, and queuing the nodes or servers and processors.

7. The method of claim 1, wherein the training includes receiving periodically new or updated training data from a master node or server in the data center.

8. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations for creating image recognition models and comprising instructions executable by the processor and configured for:
receiving captured images of hardware in a data center;
processing the captured images to produce a full set of annotated captured images;
minimizing the full set of annotated captured images with a template, wherein a minimum set of classifications based on pruning classifications in a master set of annotations is used to create a simplified set of images, wherein the pruning classifications is performed by identifying annotation patterns and applying multiple heuristics; and
training the simplified set of images into a mobile image recognition model, to understand patterns on the original annotated captured images to predict location of the hardware in the data center.

9. The system of claim 8, wherein the captured images are image frames or video captured by a smartphone implementing Bluetooth Low Energy (BLE).

10. The system of claim 8, wherein the captured images include location in the data center.

11. The system of claim 8, wherein processing is done in sequence with a node or server in the data center and/or a smartphone.

12. The system of claim 8, wherein the processing includes receiving periodically a new or updated training master image recognition model from a master node or server in the data center.

13. The system of claim 8, wherein the processing includes identifying available nodes or servers, and processors in the available nodes and servers, and queuing the nodes or servers and processors.

14. The system of claim 8, wherein the training includes receiving periodically new or updated training data from a master node or server in the data center.

15. A non-transitory, computer-readable storage medium embodying computer program code, the computer program code comprising computer executable instructions configured for:
receiving captured images of hardware in a data center;
processing the captured images to produce a full set of annotated captured images;
minimizing the full set of annotated captured images with a template, wherein a minimum set of classifications based on pruning classifications in a master set of annotations is used to create a simplified set of images, wherein the pruning classifications is performed by identifying annotation patterns and applying multiple heuristics; and
training the simplified set of images into a mobile image recognition model, to understand patterns on the original annotated captured images to predict location of the hardware in the data center.

16. The non-transitory, computer-readable storage medium of claim 15, wherein the captured images include location in the data center.

17. The non-transitory, computer-readable storage medium of claim 15, wherein the processing is done in sequence with a node or server in the data center and/or a smartphone implementing Bluetooth Low Energy (BLE).

18. The non-transitory, computer-readable storage medium of claim 15, wherein the processing includes receiving periodically a new or updated training master image recognition model from a master node or server in the data center.

19. The non-transitory, computer-readable storage medium of claim 15, wherein the processing includes identifying available nodes or servers, and processors in the available nodes and servers, and queuing the nodes or servers and processors.

20. The non-transitory, computer-readable storage medium of claim 15, wherein the training includes receiving periodically new or updated training data from a master node or server in the data center.

* * * * *